US010451953B2

(12) United States Patent
Peled et al.

(10) Patent No.: US 10,451,953 B2
(45) Date of Patent: Oct. 22, 2019

(54) ACOUSTO-OPTIC DEFLECTOR WITH MULTIPLE OUTPUT BEAMS (71) Applicant: Orbotech Ltd., Yavne (IL)

(72) Inventors: Itay Peled, Jerusalem (IL); Zvi Kotler, Tel Aviv (IL); Ronald Kaminsky, Kfar Saba (IL)

(73) Assignee: Orbotech Ltd., Yavne (IL)

( * ) Notice: Subject to any disclaimer, the term of this patent is extended or adjusted under 35 U.S.C. 154(b) by 0 days.

(21) Appl. No.: 15/524,282

(22) PCT Filed: Nov. 5, 2015

(86) PCT No.: PCT/IL2015/051068
§ 371 (c)(1),
(2) Date: May 4, 2017

(87) PCT Pub. No.: WO2016/075681
PCT Pub. Date: May 19, 2016

(65) Prior Publication Data
US 2017/0336697 A1    Nov. 23, 2017

Related U.S. Application Data (60) Provisional application No. 62/078,450, filed on Nov. 12, 2014.

(51) Int. Cl.
*G02F 1/33* (2006.01)
*G02F 1/11* (2006.01)

(52) U.S. Cl.
CPC ............... *G02F 1/332* (2013.01); *G02F 1/11* (2013.01); *G02F 1/33* (2013.01); *G02F 2203/24* (2013.01)

(58) Field of Classification Search
CPC ... G02F 1/11; G02F 1/33; G02F 1/332; G02F 2203/24
(Continued)

(56) References Cited

U.S. PATENT DOCUMENTS 3,935,566 A    1/1976    Snopko
5,138,482 A    8/1992    Hatori et al.
(Continued)

FOREIGN PATENT DOCUMENTS

CN    102281983 A    12/2011
CN    103080820 A    5/2013
(Continued)

OTHER PUBLICATIONS

David L. Hecht, "Multifrequency Acoustooptic Diffraction," IEEE Transactions on Sonics and Ultrasonics, Jan. 1977, pp. 7-18, vol. SU-24, No. 1.
(Continued)

*Primary Examiner* — Brandi N Thomas
(74) *Attorney, Agent, or Firm* — Sughrue Mion, PLLC (57) ABSTRACT Optical apparatus includes an acousto-optic medium and an array of multiple piezoelectric transducers attached to the acousto-optic medium. A drive circuit is coupled to apply to the piezoelectric transducers respective drive signals including at least first and second frequency components at different, respective first and second frequencies and with different, respective phase offsets for the first and second frequency components at each of the multiple piezoelectric transducers.

13 Claims, 8 Drawing Sheets (58) Field of Classification Search
USPC ......... 359/285–287, 289–292, 298, 305, 311
See application file for complete search history.

(56) References Cited

U.S. PATENT DOCUMENTS

| | | | |
|---|---|---|---|
| 5,255,257 | A | 10/1993 | Bryant et al. |
| 5,890,789 | A | 4/1999 | Inagaki et al. |
| 7,019,891 | B2 | 3/2006 | Johnson |
| 7,538,929 | B2 | 5/2009 | Wasilousky |
| 7,667,888 | B2 | 2/2010 | Wasilousky |
| 8,395,083 | B2 | 3/2013 | Naveh et al. |
| 8,681,412 | B2 | 3/2014 | Widzgowski et al. |
| 10,018,889 | B2 | 7/2018 | Rozsa et al. |
| 2002/0088085 | A1 | 7/2002 | Chen |
| 2002/0141039 | A1 | 10/2002 | Mermelstein et al. |
| 2004/0233408 | A1 | 11/2004 | Sievers |
| 2005/0056626 | A1 | 3/2005 | Gross et al. |
| 2005/0212888 | A1 | 9/2005 | Lehmann et al. |
| 2009/0073544 | A1 | 3/2009 | Schweitzer et al. |
| 2009/0074987 | A1 | 3/2009 | Auyeung et al. |
| 2009/0130427 | A1 | 5/2009 | Grigoropoulos et al. |
| 2010/0278521 | A1* | 11/2010 | Sandler .................. B64G 3/00 396/155 |
| 2011/0089412 | A1 | 4/2011 | Fujimori et al. |
| 2011/0188016 | A1 | 8/2011 | De Jager et al. |
| 2011/0278269 | A1 | 11/2011 | Gold et al. |
| 2011/0304900 | A1* | 12/2011 | Widzgowski .......... G02F 1/113 359/287 |
| 2014/0071421 | A1 | 3/2014 | De Jager et al. |
| 2014/0160452 | A1 | 6/2014 | De Jager et al. |
| 2015/0097316 | A1 | 4/2015 | DeSimone et al. |

FOREIGN PATENT DOCUMENTS

| | | |
|---|---|---|
| JP | 49-50538 S | 6/1947 |
| JP | 50-75054 | 6/1975 |
| JP | 3-179326 | 8/1991 |
| JP | 2014510419 A | 4/2014 |
| TW | 200907528 A | 2/2009 |
| WO | 2013/023874 A1 | 2/2013 |
| WO | 2013/124114 A1 | 8/2013 |
| WO | 2013/0165241 A1 | 11/2013 |
| WO | 2013182367 A1 | 12/2013 |
| WO | 2015/056253 A1 | 4/2015 |

OTHER PUBLICATIONS

S. N. Antonov et al., "Efficient Multiple-Beam Bragg Acoustooptic Diffraction with Phase Optimization of a Multifrequency Acoustic Wave," Technical Physics, 2007, pp. 1053-1060, vol. 52, No. 8.
Written Opinion of the International Searching Authority of PCT/IL2015/051068 dated Feb. 15, 2016.
International Search Report of PCT/IL2015/051068 dated Feb. 15, 2016.
International Search Report and Written Opinion, issued by International Searching Authority in corresponding International Application No. PCT/IL2015/051068, dated Feb. 15, 2016.
Baseman, R., et al., "Laser Induced Forward Transfer", Materials Research Society Symposia Proceedings, 1988, vol. 101, pp. 237-242 (8 pages).
Communication dated Jan. 29, 2019 from the Japanese Patent Office in application No. 2017-504395.
David A. Willis et al., "Microdroplet deposition by laser-induced forward transfer," Applied Physics Letters 86, Department of Mechanical Engineering, Southern Methodist University, Dallas, Texas 75275,. Jun. 7, 2005, pp. 1-3.
David P. Banks et al., "Nanodroplets deposited in microarrays by femtosecond Ti:sapphire laser-induced forward transfer," Applied Physics Letters 89, Optoelectronics Research Centre (ORC), University of Southampton, Southampton S017 IBJ, United Kingdom, Nov. 7, 2006, pp. 1-3.

Alberto Pique, et al.; "Laser Forward Transfer of Electronic and Power Generating Materials," Laser Ablation and its Applications, vol. 129 of the series Springer Series in Optical Sciences pp. 339-373. Online ISBN: 978-0-387-30453-3; DOI: 10.1007/978-0-387-30453-3-14; Series ISSN: 0342-4111; Dec. 31, 2007, pp. 344-346.
International Search Report and Written Opinion, issued by International Searching Authority in corresponding International Application No. PCT/IL2016/050585 dated Sep. 19, 2016.
Communication dated Aug. 1, 2018, from United States Patent and Trademark Office in counterpart application No. 15644857.
Communication dated May 3, 2019, issued by the Taiwan Patent Office in corresponding Taiwanese Application No. 104137228.
Communication dated Apr. 17, 2019, issued by the China National Intellectual Property Administration in corresponding Chinese Application No. 201680040497.7.
Communication dated Jul. 31, 2019 from the State Intellectual Property Office of the P.R.C. in counterpart application No. 201580057032.8.
David A. Willis et al., "Microdroplet deposition by laser-induced forward transfer," Applied Physics Letters 86, Department of Mechanical Engineering, Southern Methodist University, Dallas, Texas 75275,. Jun. 7, 2005, (244103) pp. 1-3.
David A. Willis et al., "The effect of melting-induced volumetric expansion on initiation of laser-induced forward transfer," Applied Surface Science 253, Department of Mechanical Engineering. Dec. 1, 2006, pp. 4759-4763.
David P. Banks et al., "Nanodroplets deposited in microarrays by femtosecond Ti:sapphire laser-induced forward transfer," Applied Physics Letters 89, Optoelectronics Research Centre (ORC), University of Southampton, Southampton SO17 IBJ, United Kingdom, Nov. 7, 2006, pp. 1-3.
David L. Hecht, "Multifrequency Acoustooptic Diffraction," IEEE Transactions on Sonics and Ultrasonics, vol. SU-24, No. 1, Jan. 1977, pp. 7-18.
S.N. Antonov et al. in "Efficient Multiple-Beam Bragg Acoustooptic Diffraction with Phase Optimization of a Multifrequency Acoustic Wave," Technical Physics, vol. 52, No. 8, pp. 1053-1060 (2007).
Alberto Pique, et al,; "Laser Forward Trasnfer of Electronic and Power Generating Materials," Laser Ablation and its Applications, vol. 129 of the series Springer Series in Optical Sciences pp. 339-373, Online ISBN: 978-0-387-30453-3; DOI: 10.1007/978-0-387-30453-3-14; Series ISSN: 0342-4111; Dec. 31, 2007, pp. 344-346.
International Search Report and Written Opinion, issued by International Searching Authority in corresponding International Application No. PCT/IL2016/0585 dated Sep. 19, 2016.
International Search Report and Written Opinion, issued by International Searching Authority in corresponding International Application PCT/IB2015/055862 dated Nov. 18, 2015.
Andreas Gehner, "Status and Perspectives," Mems Ao Micro Mirror Development at IMPS, Fraunhofer IPMS, pp. 1-30.
Fröhlich B. et al., "A two-frequency acousto-optic modulator driver to improve the beam pointing stability during intensity ramps" Feb. 2, 2008, pp. 1-4.
Kuldeep Singh et al., "Suppression of FWM Crosstalk on WDM Systems Using Unequally Spaced Channel Algorithims—A Survey", International Journal of Advanced Research in Computer Science and Software Engineering, Dec. 2013, pp. 25-31, vol. 3, Issue 12, ISSN: 2277 128X (7 pages total).
Yogita Wadhwa et al., "Golomb Ruler Sequence Generation and Optimization using Modified Firefly Algorithim", SSRG International Journal of Electronics and Communications Engineering (SSRG-IJECE) Jul. 2014, pp. 1-8, vol. 1, issue 5, ISSN: 2348-8549.
Isomet Corp., "Acousto-Optic Modulation", pp. 1-13, AN0510, Springfield, VA, USA.
Gazalet et al, "Acousto-optic multifrequency modulators: reduction of the phase-grating, intermodulation products", Applied Optics, May 1, 1993, pp. 2455-2460, vol. 32, No. 13 (8 pages total).
Translation of Japanese Office Action drafted Aug. 28, 2019 in corresponding Japanese Application No. 2017-517354.

\* cited by examiner

ACOUSTO-OPTIC DEFLECTOR WITH MULTIPLE OUTPUT BEAMS

FIELD OF THE INVENTION

The present invention relates generally to optical devices and systems, and particularly to acousto-optic devices.

BACKGROUND

Acousto-optic devices use sound waves to diffract light. In a typical device of this sort, a transducer, such as a piezoelectric transducer, is attached to an acousto-optic medium, typically a suitable transparent crystal or glass. The transducer is driven by an electrical signal to vibrate at a certain frequency, and thus creates sound waves in the acousto-optic medium. The expansion and compression of the acousto-optic medium due to the sound waves modulate the local index of refraction and thus create a grating structure within the medium, with a period determined by the frequency of the drive signal. A beam of light that is incident on this grating will thus be diffracted as it passes through the device.

Various types of acousto-optic devices are known in the art. Acousto-optic deflectors, for example, use the diffraction of the incident beam to steer the angle of the output beam. The angle of deflection of the output beam depends on the period of the grating structure in the acousto-optic material and may thus be adjusted by appropriately varying the drive signal frequency.

Acousto-optic deflectors may be driven with a multi-frequency drive signal in order to diffract the incident beam into multiple output beams at different, respective angles. Further details of this sort of multi-frequency drive are described, for example, by Hecht in "Multifrequency Acoustooptic Diffraction," *IEEE Transactions on Sonics and Ultrasonics* SU-24, pages 7-18 (1977), which is incorporated herein by reference; and by Antonov et al. in "Efficient Multiple-Beam Bragg Acoustooptic Diffraction with Phase Optimization of a Multifrequency Acoustic Wave," *Technical Physics* 52:8, pages 1053-1060 (2007), which is likewise incorporated herein by reference.

Acousto-optic devices with multiple output beams have also been described in the patent literature. For example, U.S. Pat. No. 5,890,789 describes a multi-beam emitting device, which splits a light beam emitted from a light source into a plurality of beams using an optical waveguide-type acousto-optic element or the like, driven with a plurality of electric signals with different frequencies. As another example, U.S. Patent Application Publication 2009/0073544 describes a device for the optical splitting and modulation of monochromatic coherent electromagnetic radiation, in which an acousto-optical element splits the beam generated by a beam source into a number of partial beams. An acousto-optical modulator disposed downstream of the acousto-optical element is fed the split partial beams and driven with additional high-frequency electrical signals.

As still another example, U.S. Pat. No. 5,255,257 describes an electronic circuit that is said to allow an acousto-optic deflector to be used in multi-frequency mode at high power levels with a minimum amount of intermodulation between each frequency. Reduction of interference between multiple separate signal frequencies is achieved by precise control of the individual phasing of each separate frequency relative to a common reference frequency. The relative phase of each frequency is also controlled so that a low maximum power is achieved for the combined signal that is presented to the acousto-optic deflector without decreasing the overall average power of the multiple signal frequencies.

SUMMARY

Embodiments of the present invention provide improved devices and methods for optical deflection.

There is therefore provided, in accordance with an embodiment of the present invention, optical apparatus, which includes an acousto-optic medium and an array of multiple piezoelectric transducers attached to the acousto-optic medium. A drive circuit is coupled to apply to the piezoelectric transducers respective drive signals including at least first and second frequency components at different, respective first and second frequencies and with different, respective phase offsets for the first and second frequency components at each of the multiple piezoelectric transducers.

Typically, the respective phase offsets at the first and second frequencies are chosen so that acoustic waves at the first and second frequencies propagate through the acousto-optic medium with different, respective first and second wavefront angles. In a disclosed embodiment, the acousto-optic medium is configured to receive an input beam of radiation and to split the input beam into at least first and second output beams at respective first and second beam angles determined by the first and second frequencies, wherein the first and second wavefront angles are chosen so as to satisfy respective Bragg conditions at the first and second beam angles.

In some embodiments, the drive signals applied by the drive circuit further include at least a third frequency component, at a third frequency, with a different phase offset from the first and second frequency components. The at least first, second and third frequencies may define a Golomb ruler.

In a disclosed embodiment, the drive signals applied by the drive circuit further include one or more harmonic frequency components, having respective amplitudes and phases chosen so as to cancel harmonic waves generated at a multiple of at least one of the first and second frequencies in the acousto-optic medium due to at least one of the first and second frequency components.

In some embodiments, the apparatus includes a radiation source, which is configured to direct an input beam of radiation to be incident on the acousto-optic medium, wherein the acousto-optic medium is configured to split the input beam into multiple output beams at respective beam angles determined by the respective frequencies of the at least first and second frequency components. The at least first and second frequency components of the drive signals may have different, respective amplitudes that are chosen so that the multiple output beams have equal respective intensities.

There is also provided, in accordance with an embodiment of the present invention, optical apparatus, which includes an acousto-optic medium, which is configured to receive an input beam of radiation, and at least one piezoelectric transducer attached to the acousto-optic medium. A drive circuit is coupled to apply to the at least one piezoelectric transducer a drive signal including at least three frequency components, having respective frequencies that define a Golomb ruler and are selected so as to cause the acousto-optic medium to split the input beam into multiple output beams at respective beam angles determined by the respective frequencies.

The drive signal applied by the drive circuit may further include one or more harmonic frequency components, having respective amplitudes and phases chosen so as to cancel harmonic waves generated at a multiple of at least one of the respective frequencies of the at least three frequency components in the acousto-optic medium. Additionally or alternatively, the at least three frequency components of the drive signal may have different, respective amplitudes that are chosen so that the multiple output beams have equal respective intensities.

There is additionally provided, in accordance with an embodiment of the present invention, optical apparatus, which includes an acousto-optic medium, which is configured to receive an input beam of radiation, and at least one piezoelectric transducer attached to the acousto-optic medium. A drive circuit is coupled to apply to the at least one piezoelectric transducer a drive signal including multiple frequency components, which include at least first and second fundamental components, at respective first and second fundamental frequencies, which are selected so as to cause the acousto-optic medium to split the input beam into first and second output beams at respective beam angles determined by the first and second fundamental frequencies, and one or more harmonic frequency components, having respective amplitudes and phases chosen so as to cancel harmonic waves at respective multiples of the fundamental frequencies in the acousto-optic medium.

There is further provided, in accordance with an embodiment of the present invention, an optical method, which includes directing an input beam of radiation to be incident on an acousto-optic medium, to which an array of multiple piezoelectric transducers is attached. Respective drive signals are applied to the piezoelectric transducers, including at least first and second frequency components at different, respective first and second frequencies and with different, respective phase offsets for the first and second frequency components at each of the multiple piezoelectric transducers, so as to cause the acousto-optic medium to split the input beam into at least first and second output beams at respective beam angles determined by the respective first and second frequencies.

There is moreover provided, in accordance with an embodiment of the present invention, an optical method, which includes directing an input beam of radiation to be incident on an acousto-optic medium, to which at least one piezoelectric transducer is attached. A drive signal is applied to the at least one piezoelectric transducer, including at least three frequency components, having respective frequencies that define a Golomb ruler and are selected so as to cause the acousto-optic medium to split the input beam into multiple output beams at respective beam angles determined by the respective frequencies.

There is furthermore provided, in accordance with an embodiment of the present invention, an optical method, which includes directing an input beam of radiation to be incident on an acousto-optic medium, to which at least one piezoelectric transducer is attached. A drive signal is applied to the at least one piezoelectric transducer, including multiple frequency components, which include at least first and second fundamental components, at respective first and second fundamental frequencies, which are selected so as to cause the acousto-optic medium to split the input beam into first and second output beams at respective beam angles determined by the first and second fundamental frequencies, and one or more harmonic frequency components, having respective amplitudes and phases chosen so as to cancel harmonic waves at respective multiples of the fundamental frequencies in the acousto-optic medium.

The present invention will be more fully understood from the following detailed description of the embodiments thereof, taken together with the drawings in which:

DETAILED DESCRIPTION OF EMBODIMENTS

Overview

Because of their high speed and angular range, acousto-optic devices are an attractive means for generating and deflecting multiple beams of optical radiation, using a single input radiation source. Such devices have not been widely adopted in practice, however, in large part due to problems of low diffraction efficiency and nonlinearities in the acousto-optic response of the modulator. These nonlinearities result in generation of waves in the acousto-optic modulator at harmonics of the drive frequencies and at sum and difference frequencies, leading to loss of beam power to undesired diffraction orders and poor control over the power levels of the different output beams.

Embodiments of the present invention that are described herein address these problems and thus enable an acousto-optic device to generate multiple output beams with high efficiency and precise control over the power distributed to the output beams. In the disclosed embodiments, such a device comprises an acousto-optic medium, which receives an input beam of radiation, and at least one piezoelectric transducer attached to the acousto-optic medium. A drive circuit applies to the piezoelectric transducer (or transducers) a drive signal comprising multiple frequency components having novel, advantageous properties. In the disclosed embodiments, the drive signal comprises multiple fundamental components at respective fundamental frequencies, which are selected so as to cause the acousto-optic medium to split the input beam into multiple output beams at respective beam angles that are determined by the corresponding fundamental frequencies. These frequencies in the drive signal may be modulated in order to steer the output beams.

In some embodiments, in order to obviate problems arising from nonlinearities, as explained above, the drive signal also comprises harmonic frequency components, having respective amplitudes and phases chosen so as to cancel harmonic waves at multiples of the fundamental frequencies in the acousto-optic medium. As a result, energy from the input beam that would otherwise be lost to parasitic beams at undesired angles due to such harmonic waves is channeled into the desired output beams instead.

Additionally or alternatively, this sort of signal cancellation technique may be applied to suppress parasitic diffraction at angles corresponding to sums and differences of the fundamental frequencies. When the fundamental frequencies are evenly spaced, however, or even randomly spaced, certain sum and difference frequencies may coincide with one or more of the fundamental frequencies, leading to variations in amplitude among the output beams that are difficult to control. In order to ensure that the sum and difference frequencies are well separated from the fundamental frequencies, the fundamental frequencies are chosen in some embodiments of the present invention so as to define a Golomb ruler, in which no two pairs of frequencies are the same distance apart.

In some embodiments, an array of multiple piezoelectric transducers is attached to the acousto-optic medium and is driven as a phased array. For this purpose, the drive circuit applies drive signals comprising components at the various frequencies, as described above, with different, respective phase offsets for the different frequency components at each of the multiple transducers. These phase offsets are typically chosen so that acoustic waves at the different frequencies propagate through the acousto-optic medium with different, respective wavefront angles. The wavefront angles may be chosen (by appropriate choice of phase offsets) so that the multiple output beams, with their different, respective beam angles, satisfy respective Bragg conditions at these beam angles.

System Description

Figure 1:
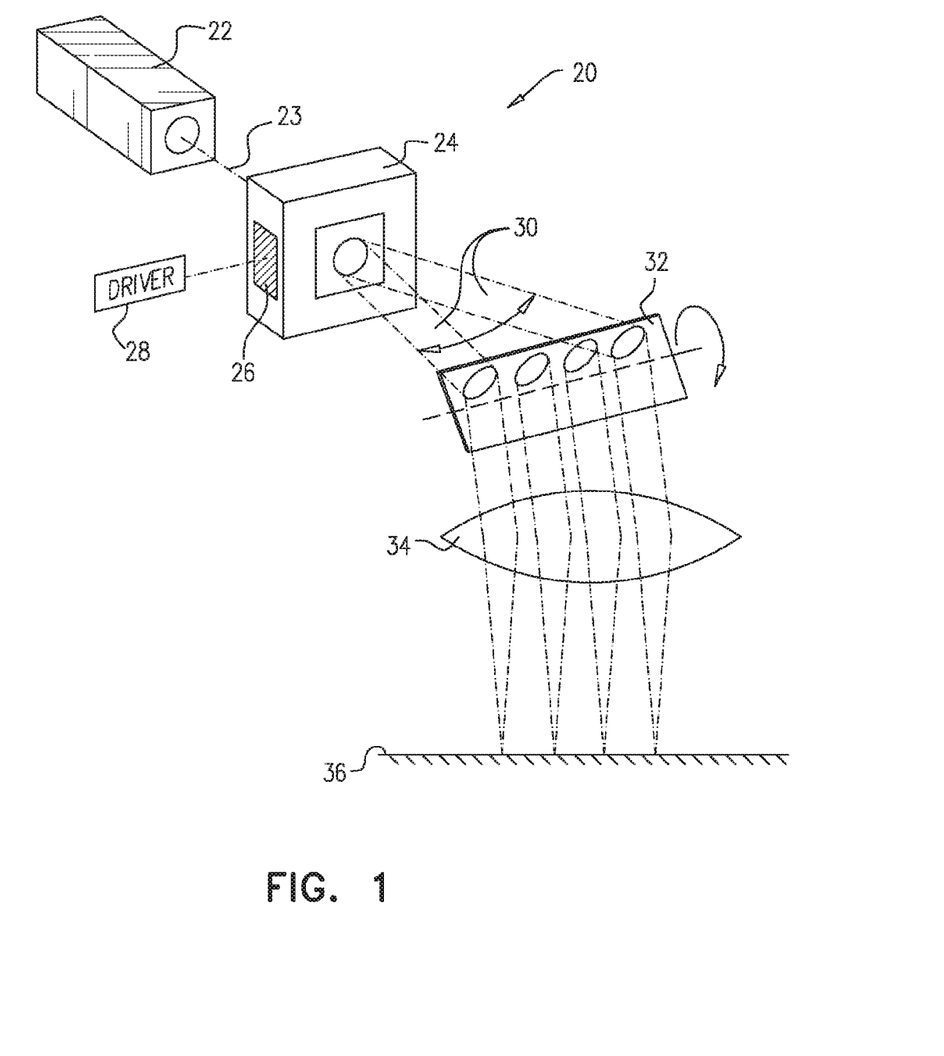
FIG. 1 is a schematic, pictorial illustration of a multi-beam deflection system, in accordance with an embodiment of the present invention.

FIG. 1 is a schematic, pictorial illustration of a multi-beam deflection system 20, in accordance with an embodiment of the present invention. A radiation source, such as a laser 22, emits a single input beam 23 of optical radiation, pulsed or continuous, which may comprise visible, ultraviolet or infrared radiation. Input beam 23 is incident on an acousto-optic deflector 24, which splits the input beam into multiple output beams 30. A drive circuit 28 (also referred to simply as a "driver") applies a multi-frequency drive signal to one or more piezoelectric transducers 26, which drive deflector 24 in order to generate acoustic waves in the acousto-optic medium that split the input beam into multiple output beams 30. Deflector 24 may comprise any suitable acousto-optic medium that is known in the art, including crystalline materials such as quartz, tellurium dioxide (TeO$_2$), germanium, or glass materials such as fused silica or chalcogenide glasses. Crystalline media may be cut along specific, preferred crystal directions to obtain the desired acousto-optic properties, in terms of sound velocity and birefringence, for example. Transducers 26 may similarly comprise one or more pieces of any suitable piezoelectric material, such as lithium niobate, which are typically attached to the acousto-optic medium via a metal bonding layer. Details of the operation of drive circuit 28 and of the drive signals that it generates are presented in the figures that follow and the description below.

In the pictured embodiment, a scanning mirror 32 scans output beams 30 over a target surface 36 via a scan lens 34. This sort of arrangement can be used in a variety of applications, such as multi-beam laser drilling and printing. Although only a single mirror 32 is shown in this figure, alternative embodiments (not shown in the figures) may employ dual-axis mirrors, which may be scanned together or independently, and/or any other suitable type of beam scanner that is known in the art. In an alternative embodiment, two acousto-optic deflectors may be deployed in series, one of which splits input beam 23 into multiple output beams, which are separated along a first direction, while the other scans the beams in the orthogonal direction. All such embodiments may take advantage of the multi-frequency drive schemes described herein and are considered to be within the scope of the present invention.

Figure 2:
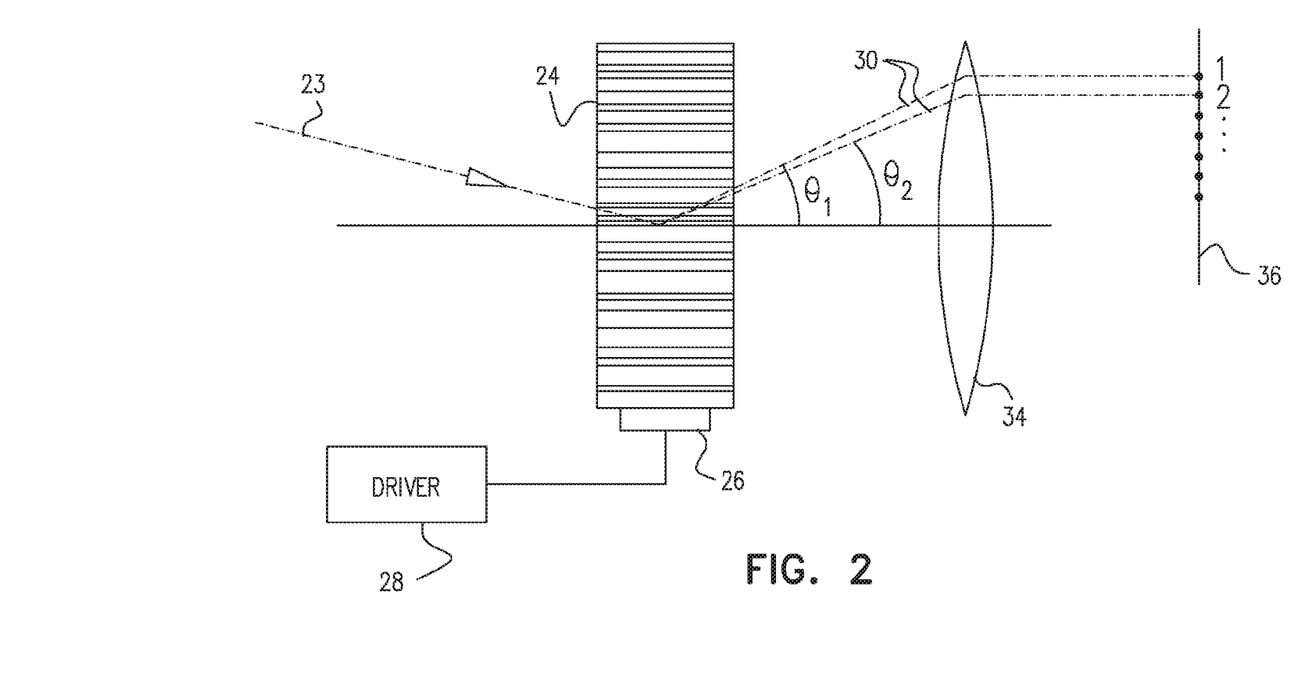
FIG. 2 is a schematic sectional view of an acousto-optic deflector used in generating multiple output beams, in accordance with an embodiment of the present invention.

FIG. 2 is a schematic sectional view of acousto-optic deflector 24, in accordance with an embodiment of the present invention. This figure illustrates the effect and operation of the multi-frequency drive provided by drive circuit 28 and piezoelectric transducer 26. The multi-frequency drive signal from drive circuit 28 causes piezoelectric transducer 26 to generate acoustic waves at the multiple drive frequencies, which propagate through the acousto-optic medium in deflector 24. Each of the different drive frequencies establishes an acousto-optic diffraction grating in the crystal at a corresponding spatial frequency, i.e., the crystal contains multiple superposed gratings of different spatial frequencies. When input beam 23 enters deflector 24, each of the gratings in the deflector diffracts the input beam at a different angle, depending on the grating frequency. Thus, deflector 24 splits input beam 23 into multiple output beams 30 at different angles $\theta_2, \theta_2, \ldots$, corresponding to the different frequencies $f_1, f_2, \ldots$. Optics 34 focus the output beams to form a corresponding array of spots 1, 2, ..., on target surface 36. By modulating the amplitudes of the signals at the corresponding frequencies, in appropriate synchronization with the pulses of input beam 23, drive circuit 26 may control the intensity of the corresponding output beams 30 generated by each pulse of the input beam. More particularly, drive circuit 28 may turn the corresponding frequency components on and off in order to choose the combination of output beams 30 to generate at each pulse. Additionally or alternatively, drive circuit 26 may modulate the component frequencies $f_1, f_2, \ldots$, in order to modulate the corresponding angles $\theta_2, \theta_2, \ldots$, and thus change the locations of the spots on surface 36.

Figure 3:
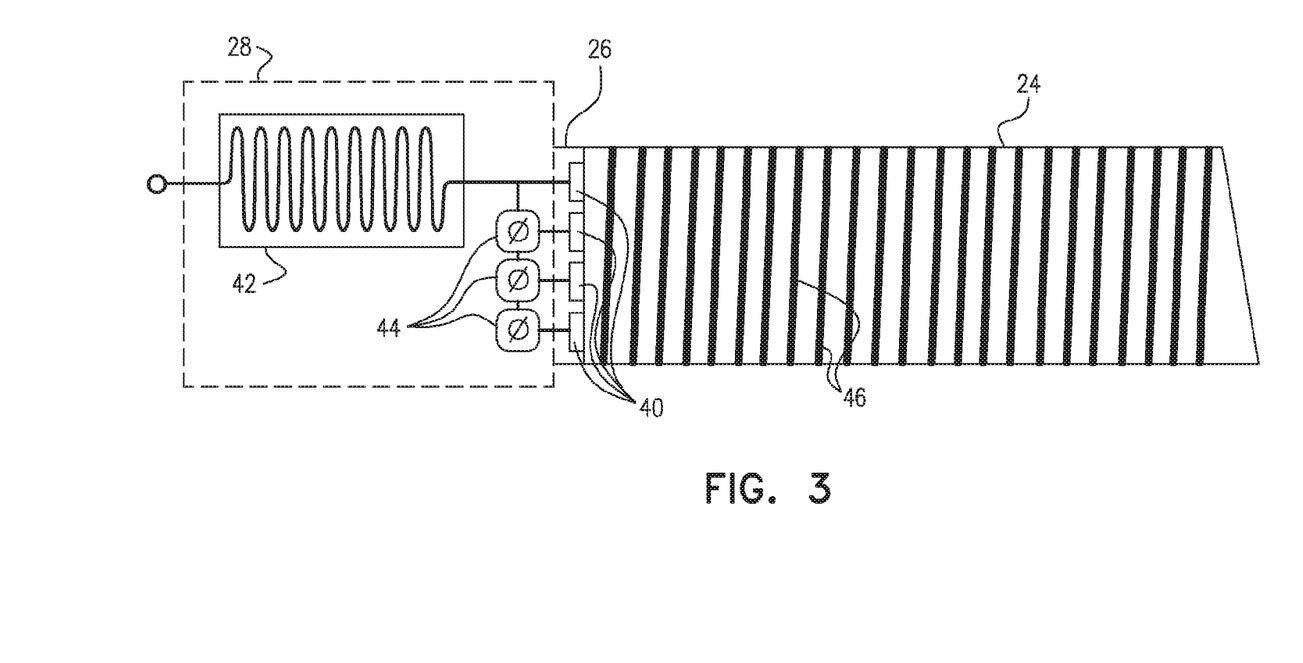
FIG. 3 is a schematic sectional view of an acousto-optic deflector driven by a phased array of transducers, in accordance with an embodiment of the present invention.

FIG. 3 is a schematic sectional view of acousto-optic deflector 24 with a phased array of transducers 40 attached to the acousto-optic medium of the deflector, in accordance with an embodiment of the present invention. Although transducer 26 is shown in the preceding figures as a unitary block, in practice all embodiments of the present invention may be implemented in this manner, using an array of transducers 40.

Drive circuit 28 is pictured conceptually as comprising a frequency generator 42, which drives transducers 40 through respective phase shifters 44, so that the signal is fed to the transducers with different, respective phase offsets. As a result, the wavefronts of acoustic waves 46 that propagate through the acoustic medium of deflector 24 are not parallel to the face of the medium to which transducers 40 are attached. The wavefront angle is typically chosen, by appropriate setting of phase shifters 44, so that the angle θ between input beam 23 and the wavefront satisfies the Bragg condition for the given drive frequency, i.e., sin θ=nλ/2d, wherein λ is the wavelength of the input beam, n is the diffraction order (typically n=1), and d is the wavelength of the acoustic waves at the given frequency. This choice of wavefront angle enhances the efficiency of diffraction by deflector 24, particularly at frequencies away from $f_0$ (the frequency at which the phase difference between adjacent channels is zero) where a passive delay line cannot match well the phase difference. Criteria for setting phase offsets between adjacent transducers are described further hereinbelow with reference to FIG. 6.

In the embodiments disclosed herein, drive circuit 28 applies respective drive multi-frequency signals to piezoelectric transducers 40, with frequency components at multiple different frequencies. For each of these frequencies, the Bragg condition results in a different diffraction angle. Therefore, for optimal performance of deflector 24 at all frequencies, phase shifters 44 apply a different phase offset for each frequency at each of transducers 40. Consequently, acoustic waves 46 at the frequencies propagate through the acousto-optic medium with different, respective wavefront angles, which are chosen so as to satisfy respective Bragg conditions for the corresponding frequencies $f_1$, $f_2$, . . . , . . . and deflection angles $θ_1$, $θ_2$, . . . , of the corresponding output beams 30.

Figure 4:
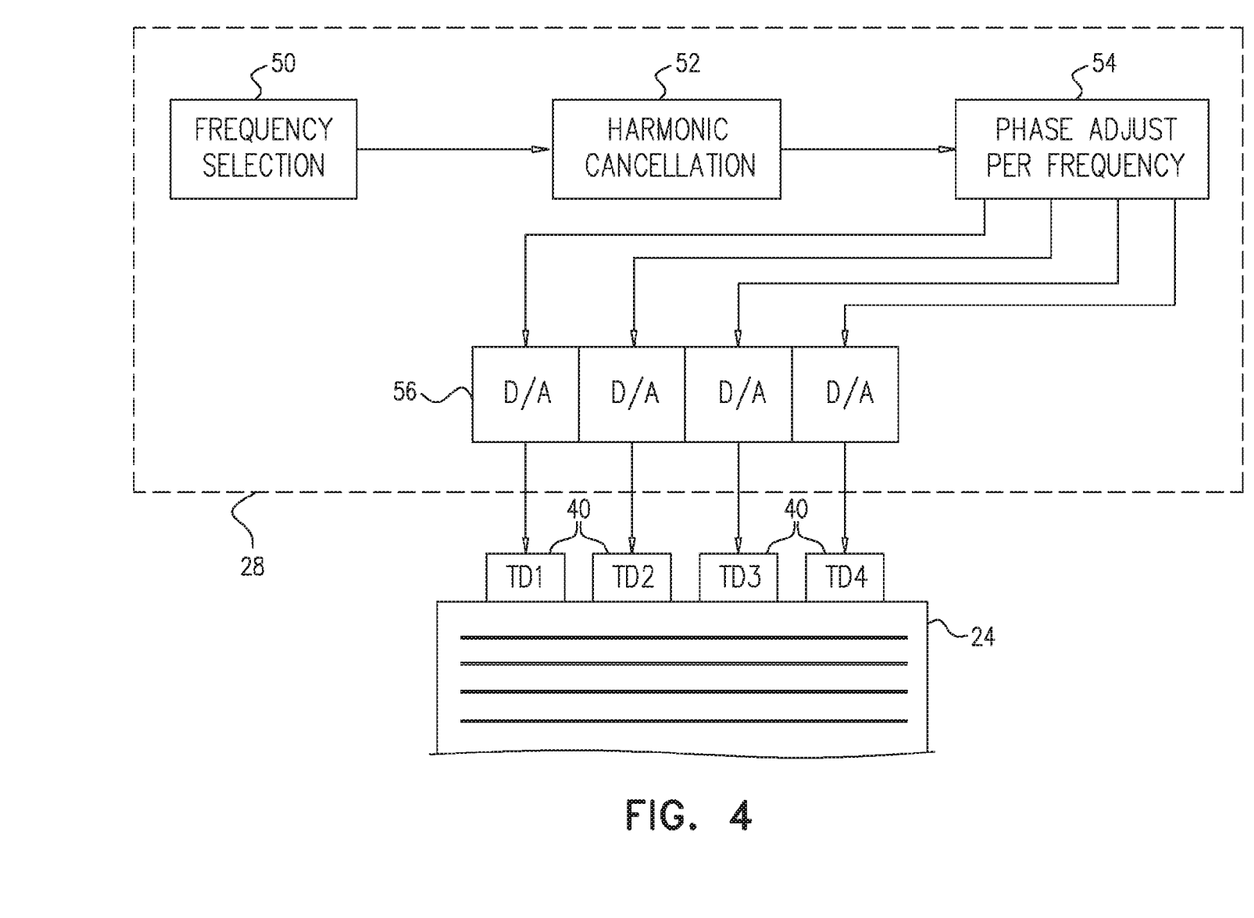
FIG. 4 is a block diagram that schematically illustrates a multi-frequency drive circuit for an acousto-optic deflector, in accordance with an embodiment of the present invention.

FIG. 4 is a block diagram that schematically illustrates functional components of drive circuit 28 for acousto-optic deflector 24, in accordance with an embodiment of the present invention. The digital components of drive circuit 28 may typically be implemented in hard-wired or programmable logic, such as in a programmable gate array. Although the blocks in FIG. 4 are shown as separate components for the sake of conceptual clarity, in practice the functions of these components may be combined in a single logic device. Alternatively, at least some of the digital components of circuit 28 may be implemented in software running on a computer or dedicated microprocessor.

A frequency selection block 50 selects a number of fundamental frequencies $f_1$, $f_2$, . . . , to be applied in driving deflector 24, in order to generate output beams 30 with corresponding deflection angles $θ_1$, $θ_2$, . . . . If the output beam angles are to be scanned transversely (as in system 20, shown in FIG. 1), block 50 may be programmed to modulate each of these frequencies over time by an amount up to ±Δf, resulting in angular scanning of each beam by up to ±Δθ. Thus, typically, block 50 generates a sequence of frequency vectors, each vector comprising a number m of fundamental frequency values $\{f_i+δf_i\}$ that are to be applied to deflector 24 at a particular time in order to generate m output beams 30 at corresponding angles $\{θ_i+δθ_i\}$, wherein $δf_i$ and $δθ_i$ are frequency and angle variations within the ranges ±Δf and ±Δθ, respectively. In practice, there are potentially $N_{max}$ separate output beams in the overall frequency range ΔF of system 20, wherein $N_{max}=ΔF*D/V_S$ (wherein D is the optical aperture, and $V_S$ is the sound velocity in the acousto-medium). The frequency shift ±Δf is the range between two adjacent frequencies (ΔF=2Δf*$N_{max}$). Typically, m sub-beams are selected within the array of the $N_{max}$ possible beams.

FIGS. 5A-5E are plots that schematically illustrates intensity variations among output beams 30 of acousto-optic deflector 24, which are generated in accordance with embodiments of the present invention. These plots illustrate the effect of frequency nonlinearities in deflector 24 on the respective intensities of the output beams, wherein the effect is quantified on the vertical axis in the figure in terms of the ratio between the variance (standard deviation—STD) of the output beam intensities relative to the mean intensity of the output beams. The horizontal axis shows the fundamental frequencies that are generated by frequency selection block 50 in various frequency selection schemes, all of which include ten fundamental frequencies. Alternatively, larger or smaller numbers of fundamental frequencies may be used. The variances in the plots were obtained by testing the beam intensities for the set of chosen frequencies many times, with randomly-chosen phases associated with each frequency in the set.

Figure 5A:
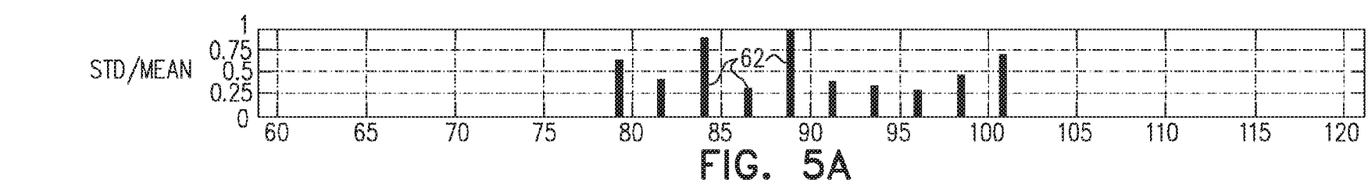
FIGS. 5A-5E are plots that schematically illustrate intensity variations among the output beams of a multi-beam acousto-optic deflector, in accordance with an embodiment of the present invention.
Figure 5B:
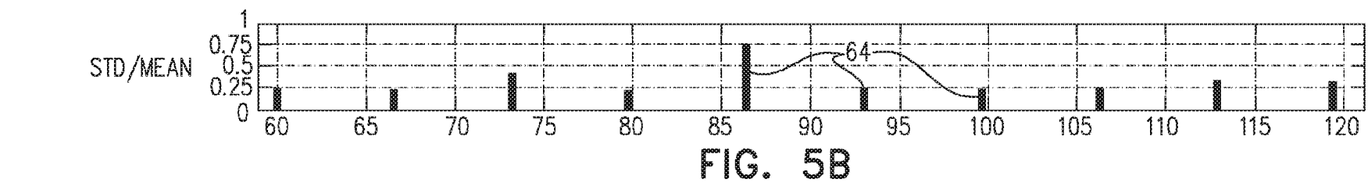

Bars 62 in FIG. 5A show the intensity variances when a set of evenly-spaced fundamental frequencies is used, with relative small intervals (approximately 2 MHz) between adjacent frequencies. Sum and difference effects among the different frequencies result in enhancement of some frequencies at the expense of others, so that the relative intensities of output beams 30 vary widely, by as much as 100%. This sort of uncontrolled intensity variation is unsuitable in many multi-beam industrial applications. The severity of the problem can be reduced by spreading the frequencies farther apart, as illustrated by bars 64, at intervals of approximately 6 MHz, as shown in FIG. 5B, but substantial intensity variations among the beams still remain.

Figure 5C:
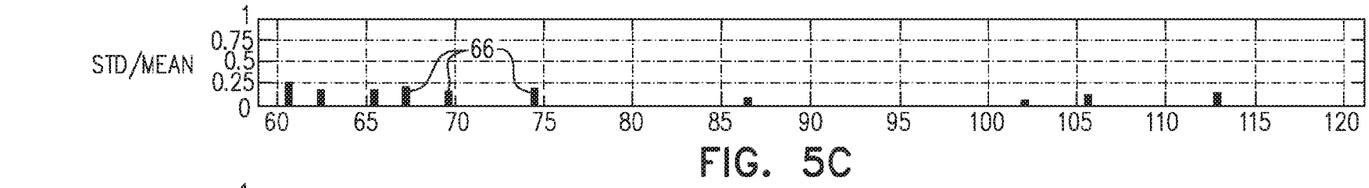
Figure 5D:
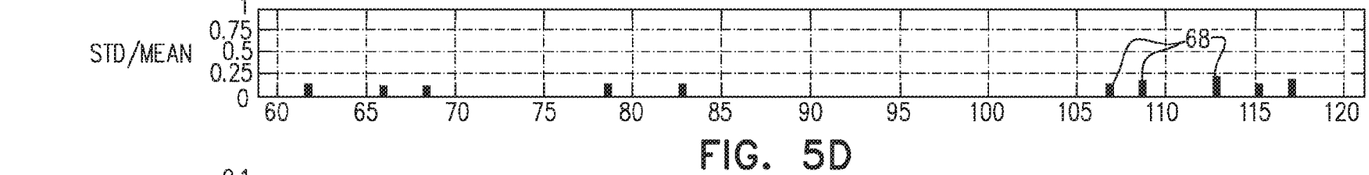
Figure 5E:
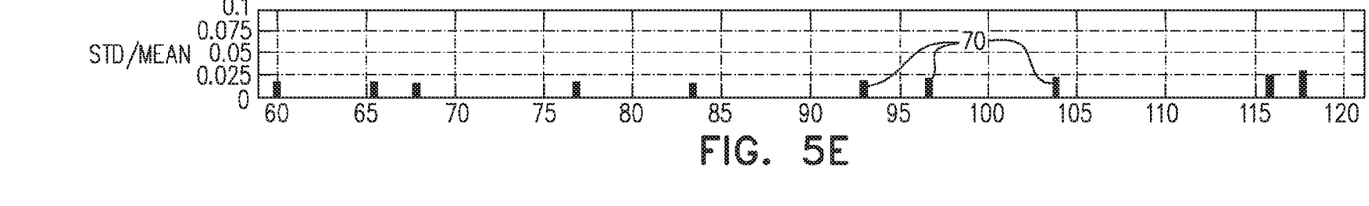

Bars 66 and 68 in FIGS. 5C and 5D illustrate another approach, in which the fundamental frequencies are spread over the available range (60-120 MHz in the present example) at random intervals. This approach reduces the intensity variances among output beams 30 to less than about 20%, but this level of variation is still too high for precision applications. In the scheme illustrated by bars 70 in FIG. 5E, the fundamental frequencies are chosen so as to define a Golomb ruler, meaning that no two pairs of frequencies are the same distance apart. The ruler is defined over the $N_{max}$ available resolution points of system 20, which are spaced apart by ΔF/($N_{max}$−1). Because of this distribution of the frequencies, sums and differences of any given pair of fundamental frequencies will not coincide with the respective sum or difference of any other pair of fundamental frequencies, and combinations of fundamental frequencies of the forms 2*f1−f2 or f1+f2−f3 will not coincide with any other fundamental frequency, but will rather fall within the intervals between bars 70. Therefore, as shown in FIG. 5E, the intensity variations between output beams 30 are less than about 2%. This is just one example of a 10-beam ruler selected from among the $N_{max}$ available output beams, and other m-beam rulers can be defined that will meet these criteria, with different distributions of ruler frequencies. Furthermore, parasitic waves in acousto-optic deflector 24 at the sum and difference frequencies of the ruler frequencies may be canceled in a manner similar to the harmonic cancellation techniques described below, by addition of frequency components at the sum and difference frequencies with respective amplitudes and phases chosen so as to cancel the parasitic waves at these frequencies.

Returning now to FIG. 4, the set of frequencies selected by block 50 is supplemented by a harmonic cancellation block 52. As explained above, nonlinearities in the acousto-optic medium of deflector 24 give rise to harmonic waves at multiples of the fundamental frequencies, and possibly also waves at intermediate frequencies given by the sums and differences between the fundamental frequencies. These nonlinear components have a parasitic effect on the performance of deflector 24, since they create grating components in the deflector that cause a portion of the energy of input beam 23 to be diffracted at undesired angles.

Block 52 addresses this problem by adding corrective harmonic frequency components to the frequency vector generated by block 50. The respective amplitudes and phases of these corrective components are chosen so as to cancel the parasitic (harmonic and sum/difference) waves in the acousto-optic medium. Specifically, block 52 computes the expected amplitudes and phases of the parasitic waves, and adds in corrective components of the same amplitudes at the parasitic frequencies, but with opposite phase. The amplitudes and phases of the corrective components may be computed a priori, based on a mathematic model of the behavior of deflector 24, or they may be set empirically. In either case, the net result will be a substantial reduction in the amplitudes of the grating components in the acousto-optic medium at the parasitic frequencies, and thus diversion of a greater portion of the input beam energy into output beams 30 in the desired angular directions.

A phase adjustment block 54 generates multiple streams of time-domain samples corresponding to the frequency components provided by blocks 50 and 54. Each stream is directed to a respective one of transducers 40 and contains the same frequency components, but with different, respective phase offsets. These phase offsets are chosen according to the desired wavefront angle of acoustic waves 46 in deflector 24 at each frequency. Typically, the relative phase offsets between the sample streams are not uniform over the entire frequency range, but rather increase with frequency, so that the wavefront angles likewise increase with frequency, in order to satisfy the Bragg condition at each frequency as explained above.

Specifically, block 54 may set the phase offsets at the different frequencies is according to the following formula:

$$\Delta\varphi(f) = \frac{2\pi \cdot S \cdot \lambda}{V_s^2} \cdot f(f_0 - f)$$

In this equation:

$\Delta\varphi(f)$ is the phase difference between two adjacent output channels of block 54 at frequency f;

S is the distance between the centers of adjacent transducers 40;

$\lambda$ is the optical beam wavelength;

$V_S$ is the acoustic velocity in the acousto-optic medium; and $f_0$ is the applied frequency that gives zero phase difference between adjacent channels and satisfies the Bragg condition for the optical output beam.

Figure 6:
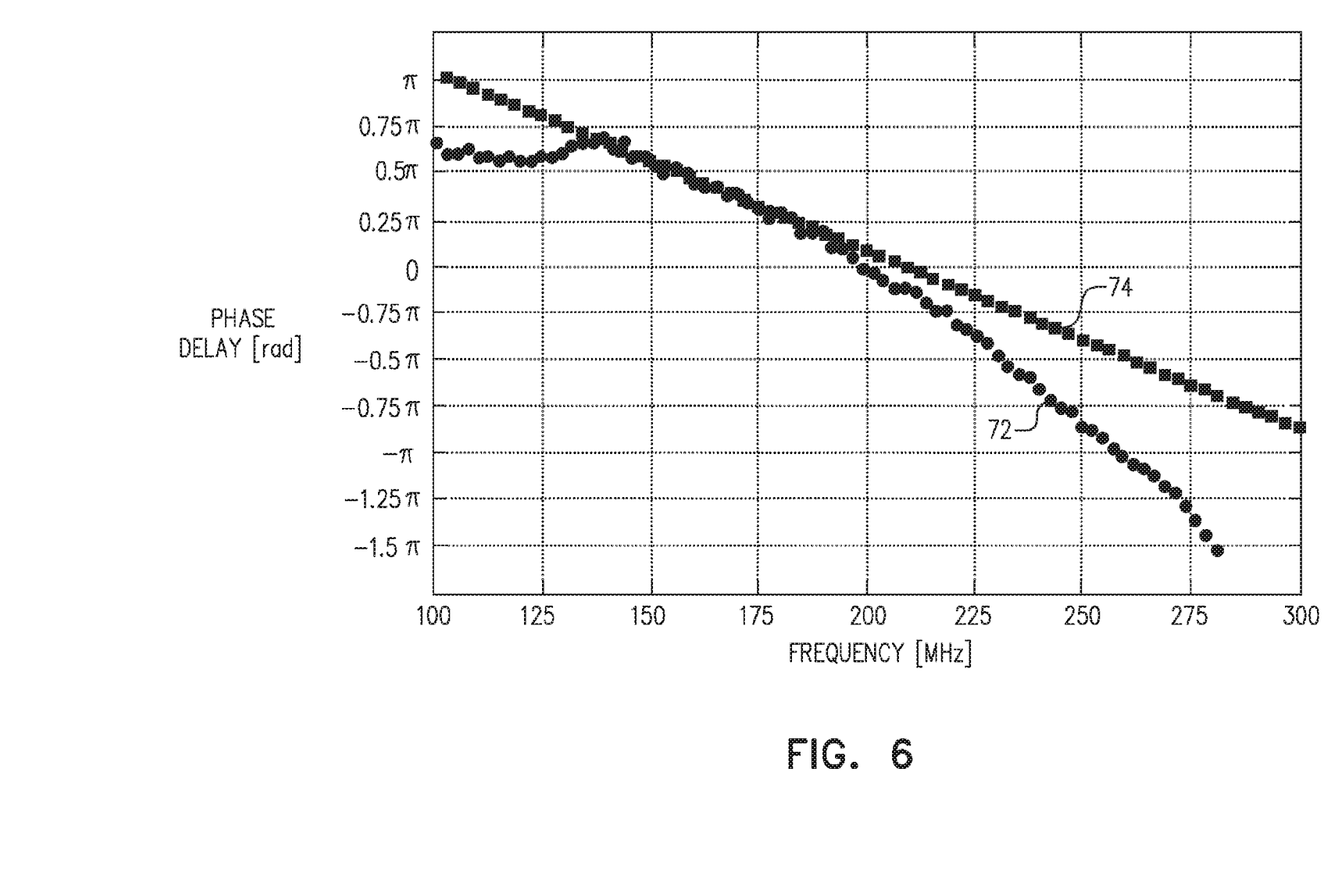
FIG. 6 is a plot that schematically illustrates phase delays applied to an array of transducers, in accordance with an embodiment of the present invention.

FIG. 6 is a plot that schematically illustrates phase delays applied by block 54 to transducers 40, in accordance with an embodiment of the present invention. A curve 72 in the figure represents the actual, measured phase delay as a function of frequency, with $f_0$=200 MHz. For comparison, a line 74 shows the phase delay as a function of frequency for a fixed, one-meter delay line. The benefit of the frequency-dependent phase adjustment provided by block 54 is apparent particularly at high frequencies.

Referring back to FIG. 4, blocks 50, 52 and 54 are typically implemented in digital logic and/or software, as explained above. The digital sample streams from block 54 are input to respective channels of a multi-channel digital/analog converter 56, which generates corresponding output signals to drive transducers 40. Assuming appropriate choice of the frequency components and phase offsets, the transducers will generate a superposition of acoustic waves in deflector 24, at different fundamental frequencies and with different wavefront angles, while parasitic waves generated by nonlinear processes in the acousto-optic medium will be suppressed.

Figure 7:
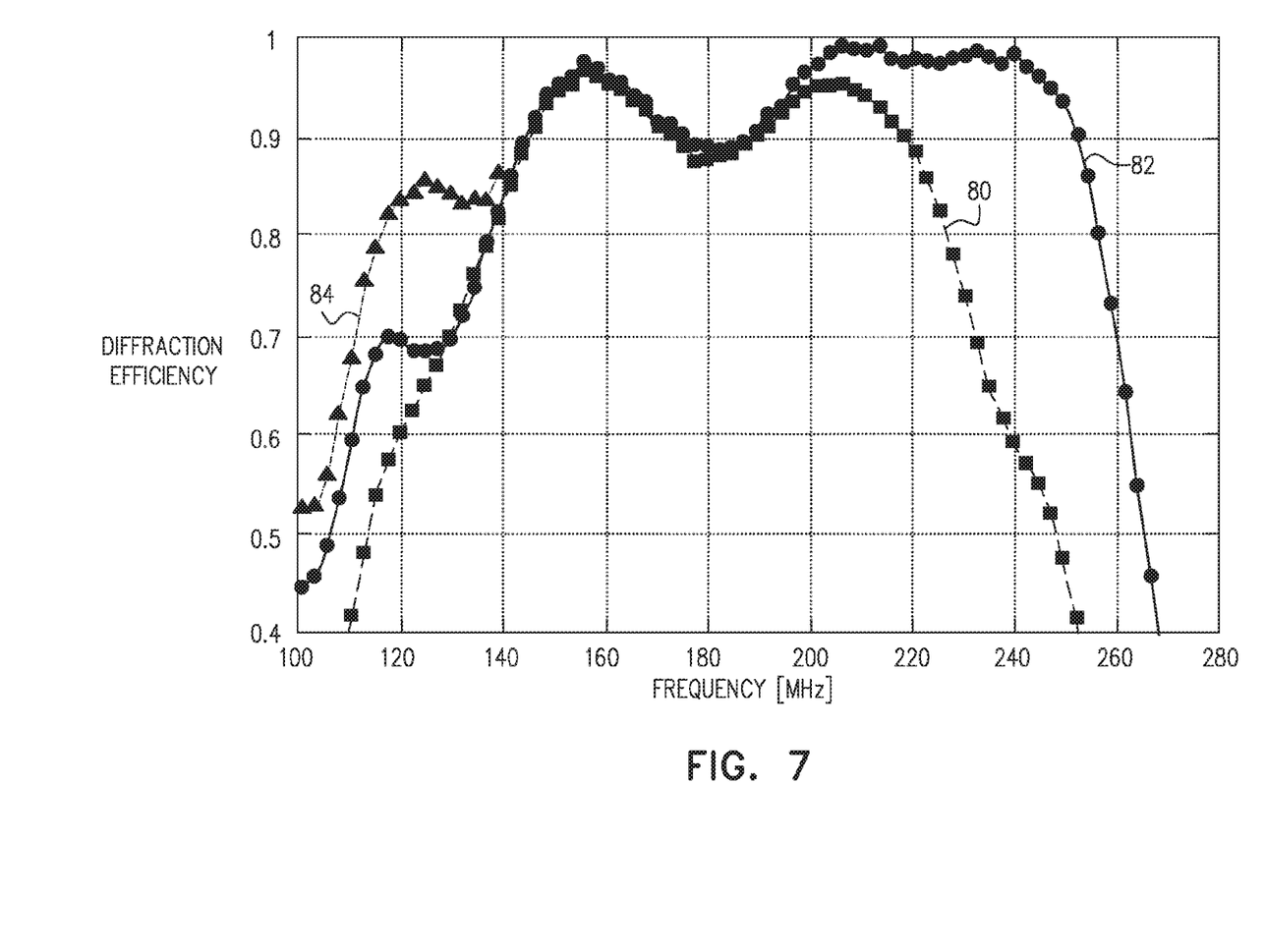
FIG. 7 is a plot that schematically shows a frequency spectrum of an acousto-optic deflector that is driven in accordance with an embodiment of the present invention.

FIG. 7 is a plot that schematically shows a frequency spectrum of acousto-optic deflector 24 when driven in accordance with embodiments of the present invention. Specifically, the plot shows the efficiency of diffraction of the deflector (i.e., the percentage of the available energy from input beam 23 that is diffracted at the desired angle) as a function of the drive frequency of the deflector.

A first curve 80 shows the baseline diffraction efficiency, when deflector 24 is driven without harmonic cancellation and with phase delay between transducers 40 set by a fixed delay line (i.e., with blocks 52 and 54 inactive). A second curve shows the effect of wavefront angle adjustment by phase adjustment (block 54), which enhances the diffraction efficiency primarily, although not exclusively, at higher frequencies. A third curve 84 shows the enhancement of efficiency, primarily at low frequencies, due to active harmonic cancellation by block 52. The net result is an enhancement of the effective bandwidth of deflector 24 by about 50%.

Figure 8:
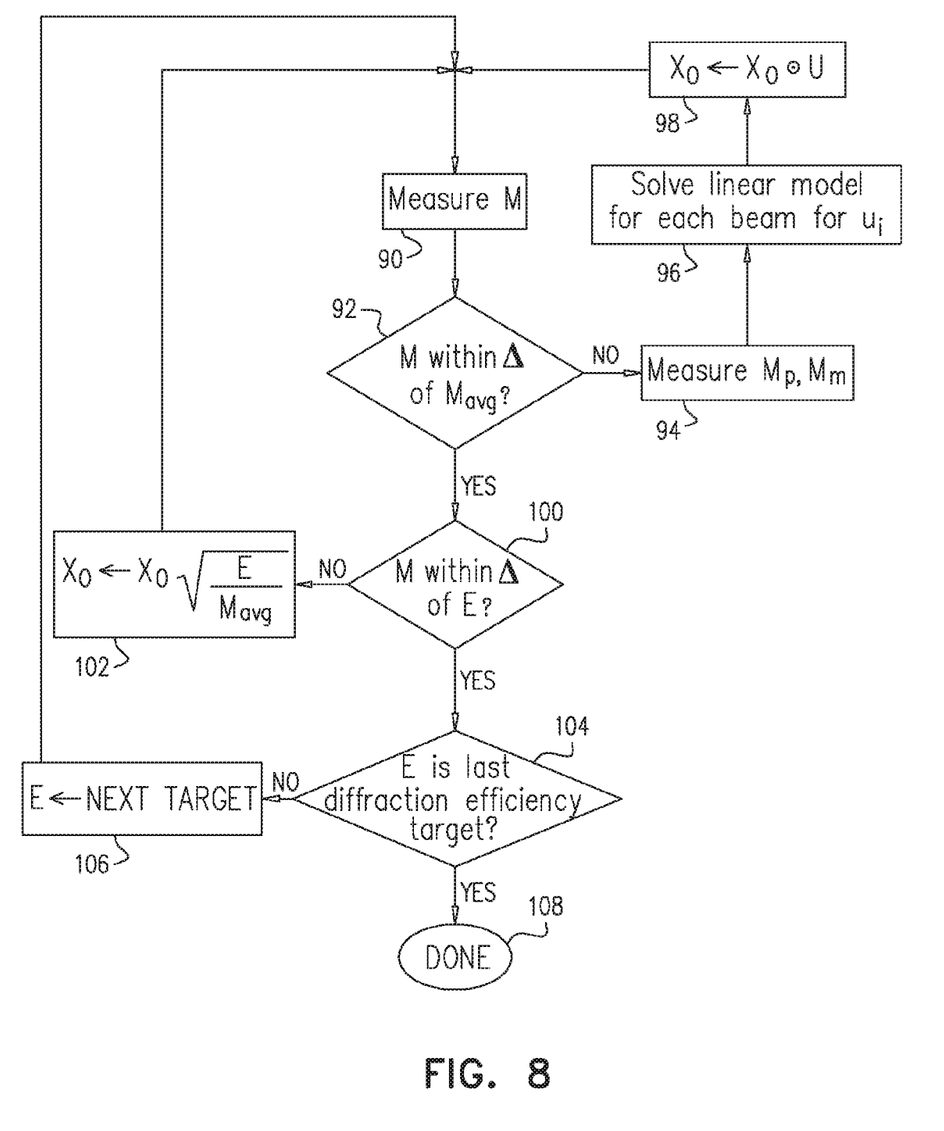
FIG. 8 is a flow chart that schematically illustrates a method for equalization of intensity among multiple output beams from an acousto-optic deflector, in accordance with an embodiment of the present invention.

FIG. 8 is a flow chart that schematically illustrates a method for equalization of intensity among output beams 30 from acousto-optic deflector 24, in accordance with an embodiment of the present invention. In many applications of system 20, such as laser printing and machining, it is important that output beams 30 have respective intensities that are equal (to within a predefined tolerance). The method of FIG. 8 may be applied by driver 28 in setting the relative amplitudes of the frequency components of the drive signal in order to satisfy this criterion. Although these settings may be made a priori, based on a calculated model, in practice it is generally preferable to measure the actual intensities of the generated output beams 30 using a suitable measurement device (for example, a camera, not shown in the figures) as an input to the present equalization algorithm in the calibration phase. The method of FIG. 8 may be performed for each non-empty subset of possible drive frequencies out of the set of ruler frequencies. For each such subset, a sequence of solutions is generated, wherein each solution generates a set of equalized-intensity output beams with slightly stronger intensities than the beams generated by the previous solution, in an iterative process. In other words, each successive solution uses the previous solution as a starting point. The intensities are expressed in terms of their diffraction efficiency, and list of target efficiencies, E (for the successive iterations), is provided as an input to the process, along with the permitted solution tolerance $\Delta$.

The calculation begins at the smallest target intensity (or efficiency), with the frequency components of the drive signal set to equal, small amplitudes. Drive circuit 28 applies a drive signal having a vector of m amplitudes $X_0$ at the m different frequency components, and the measurement device measures a vector M of the respective optical intensities of the m output beams 30, at a measurement step 90. A processor (not shown) computes the average efficiency $M_{avg}$ over M (i.e., over all beams), and evaluates the deviation of each of the efficiencies in M from $M_{avg}$, at an efficiency evaluation step 92.

If the maximum deviation computed at step 92 is greater than $\Delta$, an additional measurement $M_p$ is taken with the input amplitudes set to [$X_0 \cdot (1+\delta)$], and another measurement $M_m$ is taken with the input amplitudes set to [$X_0 \cdot (1-\delta)$], at an incremental measurement step 94. (Here $\delta$ is a small increment, which depends on the amount of noise in the measurement process, for example, $\delta$=0.05). The processor then fits a linear model for each beam separately, given the measured intensities ($M_r$, $M_m$) and the relative change from $X_0$, and solves the model for each beam i to find the relative change $u_i$ that should generate the target efficiency E, at a modeling step 96. (Alternatively, a larger number of measurements may be taken at step 94, and the processor may then compute a higher-order model, such as a quadratic model.) Taking U to be the vector of all the calculated changes $u_i$, the processor computes the vector $X_0 \otimes U$ (wherein the multiplication is done separately for each beam), at an amplitude update step 98. The result is used as the amplitude vector $X_0$ for the next iteration through step 90.

When the maximum deviation of the measured intensities in M from $M_{avg}$ is found at step 92 to be less than $\Delta$, the processor checks the current solution $X_0$ to determine whether M is within the tolerance $\Delta$ from the target efficiency, E, for the current iteration, at an efficiency evaluation step 100. If the solution is not within the tolerance $\Delta$ from E, then the current amplitude vector $X_0$ is updated accordingly, for example to the value $X_0 \sqrt{E/M_{avg}}$, at an amplitude update step 102. (Alternatively, other update factors may be used at this step, such as different exponents of $E/M_{avg}$.) The process then returns again to step 90.

When M is found at step 100 to be within $\Delta$ of E, the processor checks whether the entire list of target efficiencies E has been reached, at a list checking step 104. In not, the current vector $X_0$ becomes the starting point for the next iteration through the preceding steps, with E set to the next target efficiency in the list, at an efficiency update step 106. When the last efficiency value in the list has been reached, the equalization process ends, at a termination step 108. If an unrealistic target efficiency is chosen, however, the process may fail before reaching step 108.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optical apparatus, comprising:
an acousto-optic medium;
an array of multiple piezoelectric transducers attached to the acousto-optic medium; and
a drive circuit, which is coupled to apply to the piezoelectric transducers respective drive signals comprising at least first and second frequency components at different, respective first and second frequencies and with different, respective phase offsets for the first and second frequency components at each of the multiple piezoelectric transducers,
wherein the drive signals applied by the drive circuit further comprise one or more harmonic frequency components, having respective amplitudes and phases chosen so as to cancel harmonic waves generated at a multiple of at least one of the first and second frequencies in the acousto-optic medium due to at least one of the first and second frequency components.

2. The apparatus according to claim 1, wherein the respective phase offsets at the first and second frequencies are chosen so that acoustic waves at the first and second frequencies propagate through the acousto-optic medium with different, respective first and second wavefront angles.

3. The apparatus according to claim 2, wherein the acousto-optic medium is configured to receive an input beam of radiation and to split the input beam into at least first and second output beams at respective first and second beam angles determined by the first and second frequencies, and wherein the first and second wavefront angles are chosen so as to satisfy respective Bragg conditions at the first and second beam angles.

4. The apparatus according to claim 1, wherein the drive signals applied by the drive circuit further comprise at least a third frequency component, at a third frequency, with a different phase offset from the first and second frequency components.

5. The apparatus according to claim 4, wherein the at least first, second and third frequencies define a Golomb ruler.

6. The apparatus according to claim 1, and comprising a radiation source, which is configured to direct an input beam of radiation to be incident on the acousto-optic medium, wherein the acousto-optic medium is configured to split the input beam into multiple output beams at respective beam angles determined by the respective frequencies of the at least first and second frequency components.

7. The apparatus according to claim 6, wherein the at least first and second frequency components of the drive signals have different, respective amplitudes that are chosen so that the multiple output beams have equal respective intensities.

8. An optical method, comprising:
directing an input beam of radiation to be incident on an acousto-optic medium, to which an array of multiple piezoelectric transducers is attached; and
applying to the piezoelectric transducers respective drive signals comprising at least first and second frequency components at different, respective first and second frequencies and with different, respective phase offsets for the first and second frequency components at each of the multiple piezoelectric transducers, so as to cause the acousto-optic medium to split the input beam into at least first and second output beams at respective beam angles determined by the respective first and second frequencies,
wherein applying the respective drive signals further comprises applying one or more harmonic frequency components, having respective amplitudes and phases chosen so as to cancel harmonic waves generated at a multiple of at least one of the first and second frequencies in the acousto-optic medium due to at least one of the first and second frequency components.

9. The method according to claim 8, wherein the respective phase offsets at the first and second frequencies are chosen so that acoustic waves at the first and second frequencies propagate through the acousto-optic medium with different, respective first and second wavefront angles.

10. The method according to claim 9, wherein the first and second wavefront angles are chosen so as to satisfy respective Bragg conditions at the first and second beam angles.

11. The method according to claim 8, wherein applying the respective drive signals further comprises applying at least a third frequency component, at a third frequency, with a different phase offset from the first and second frequency components.

12. The method according to claim 11, wherein the at least first, second and third frequencies define a Golomb ruler.

13. The method according to claim 8, wherein applying the drive signals comprises setting the at least first and second frequency components of the drive signals to have different, respective amplitudes that are chosen so that the multiple output beams have equal respective intensities.

\* \* \* \* \*